Sept. 19, 1967  M. R. JOHNSON ETAL  3,342,048
DETONATION WAVE FORMING MACHINE
Filed Aug. 13, 1964  6 Sheets-Sheet 1
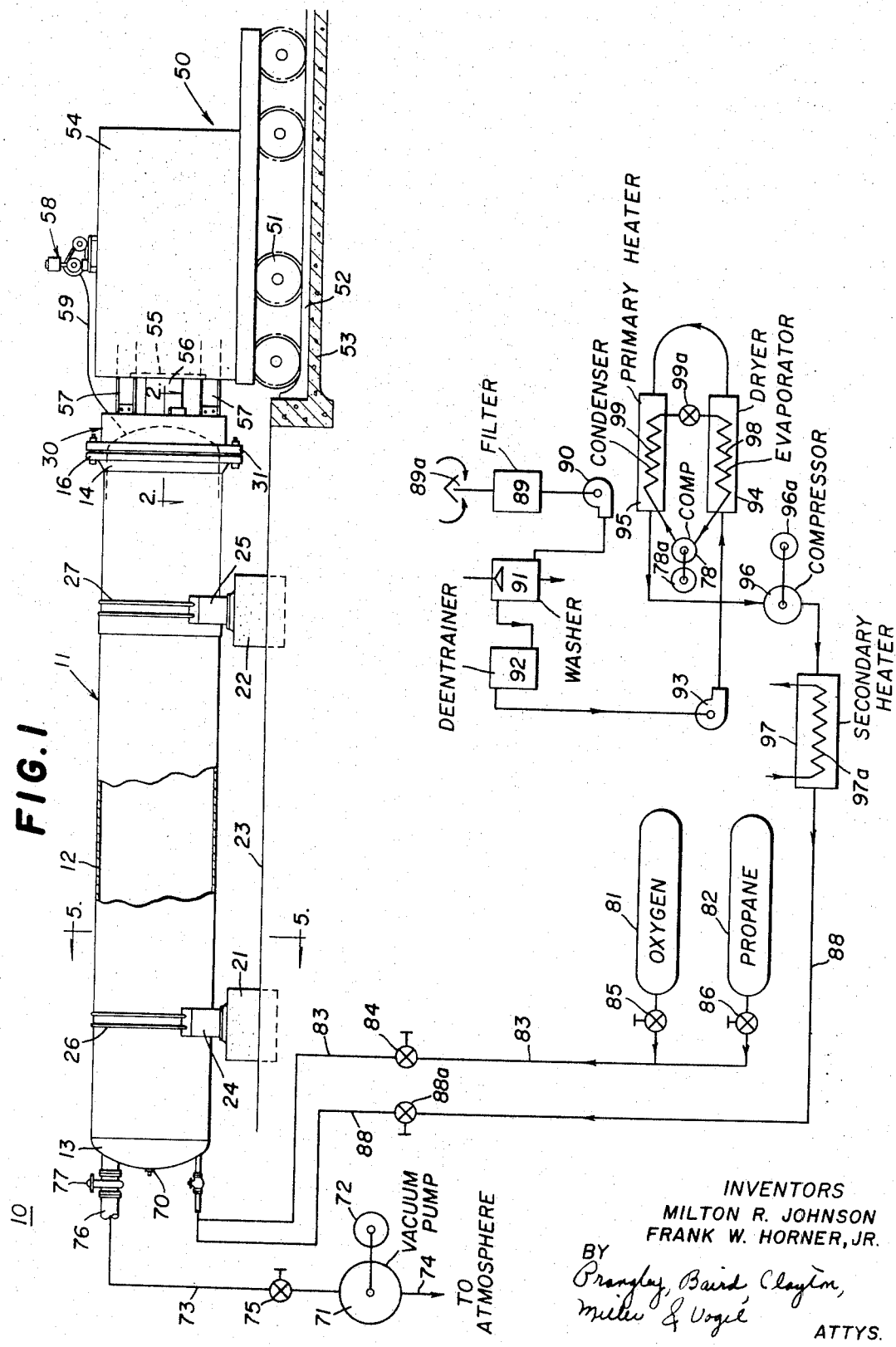
INVENTORS
MILTON R. JOHNSON
FRANK W. HORNER, JR.
BY Pringle, Baird Clayton,
Miller & Vogel
ATTYS.

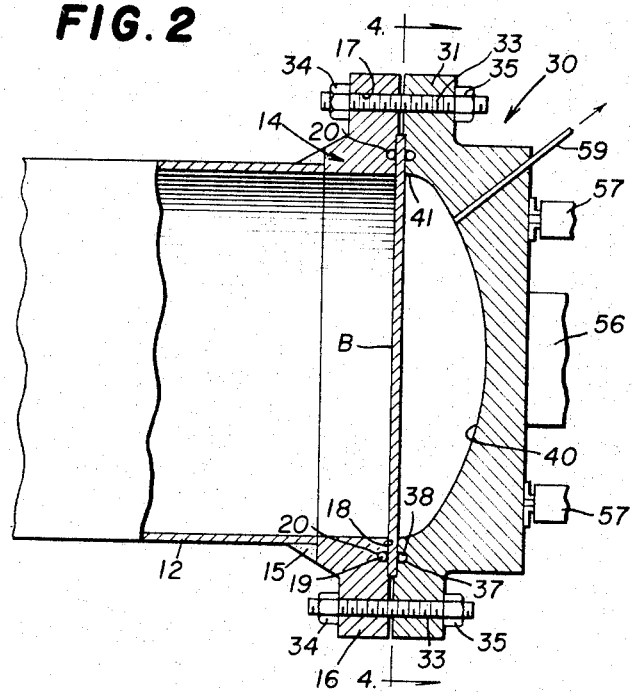
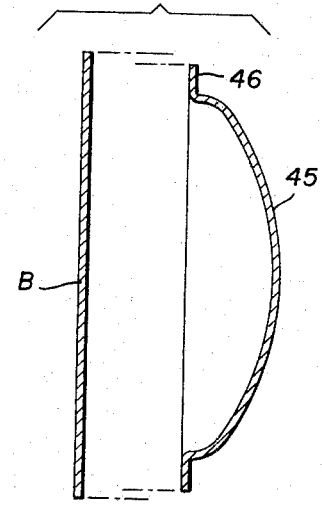
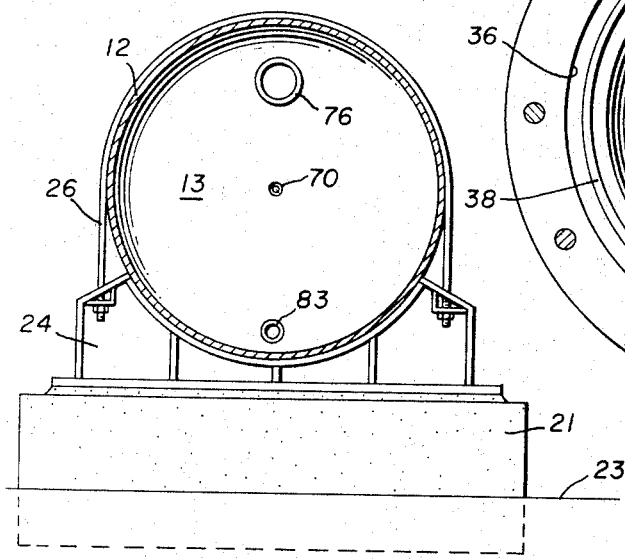

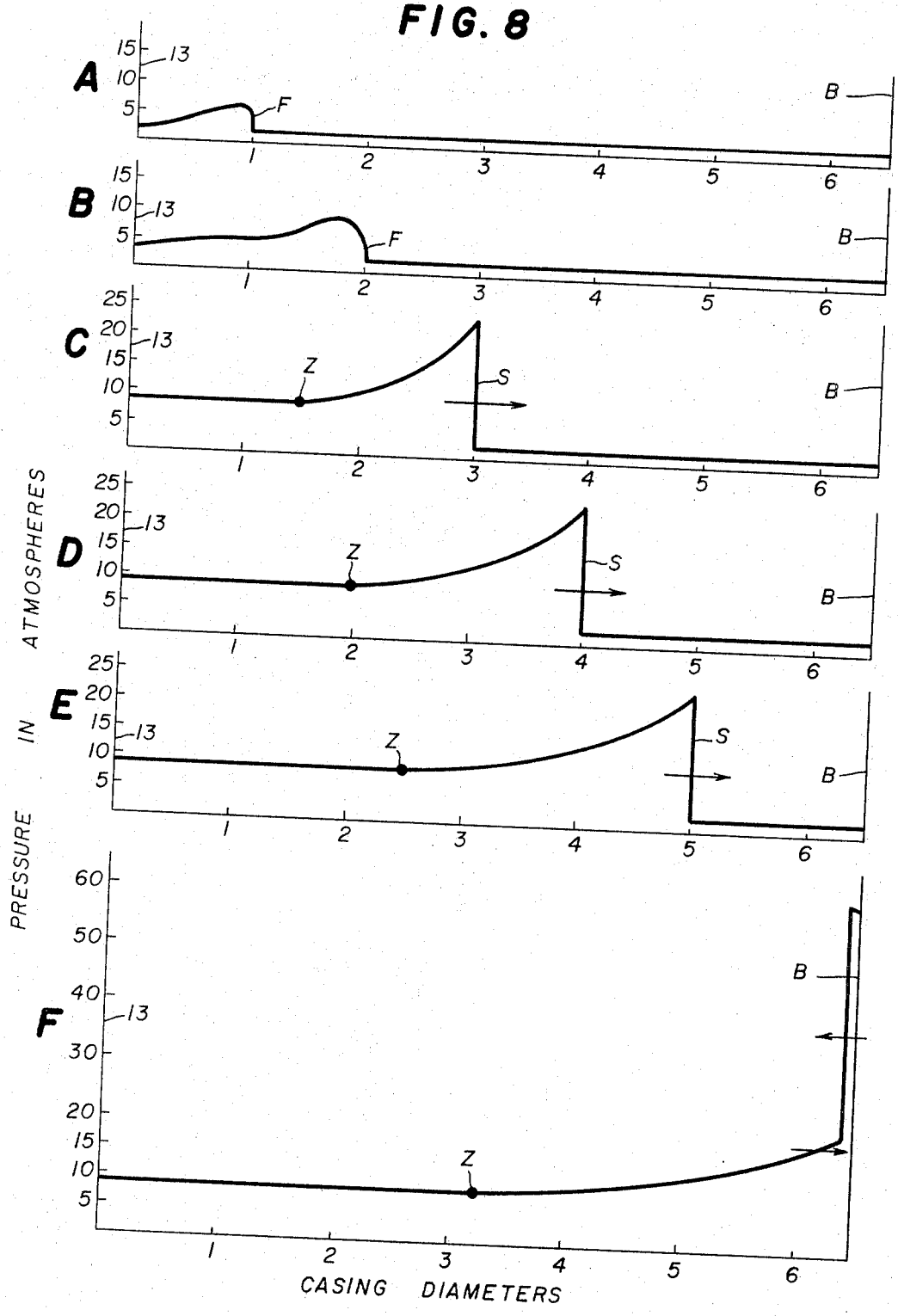

Sept. 19, 1967 M. R. JOHNSON ET AL 3,342,048
DETONATION WAVE FORMING MACHINE
Filed Aug. 13, 1964 6 Sheets-Sheet 5
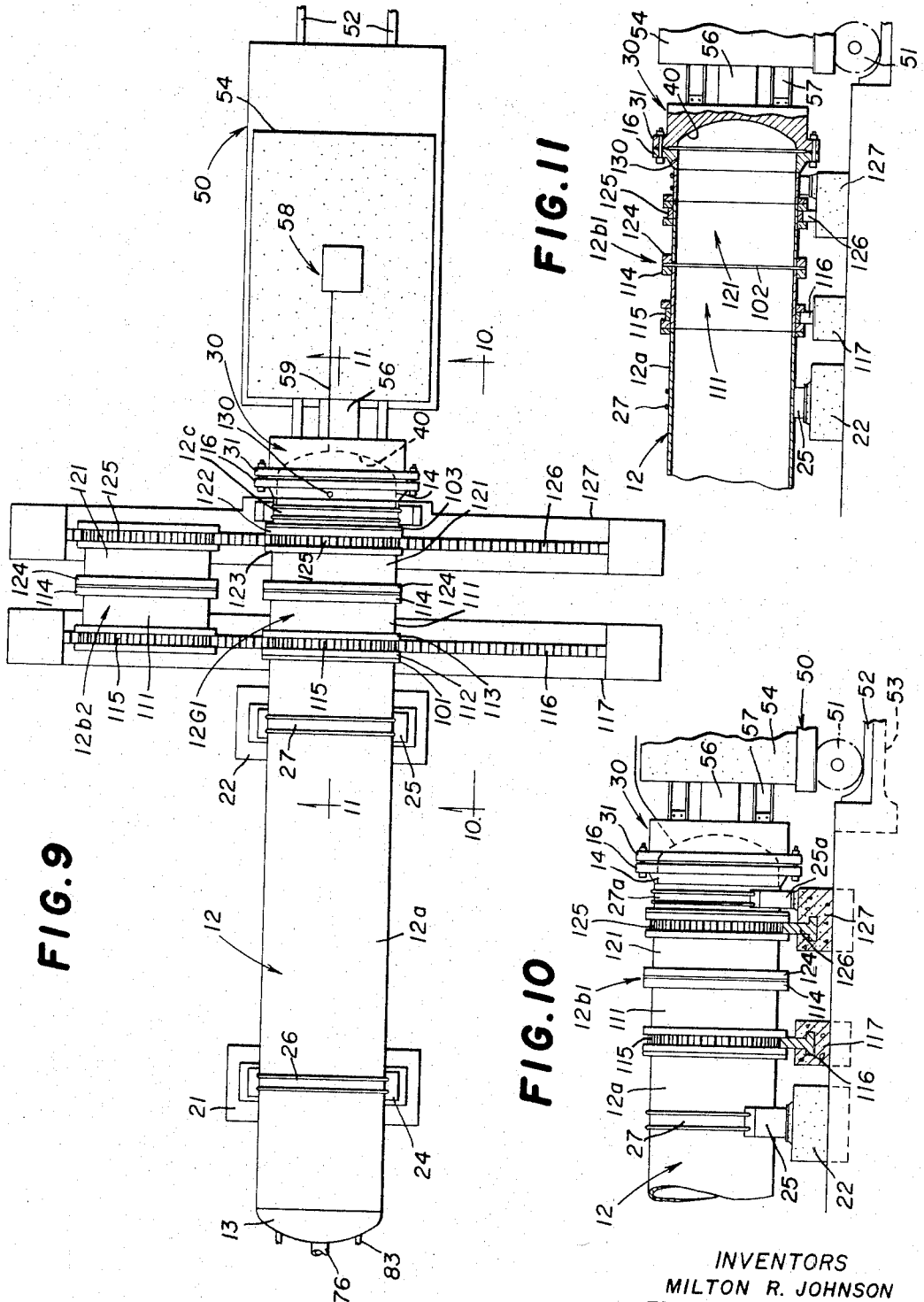
INVENTORS
MILTON R. JOHNSON
FRANK W. HORNER, JR.
BY
Prangley, Baird, Clayton,
Miller & Vogel,
ATTYS.

United States Patent Office
3,342,048
Patented Sept. 19, 1967

3,342,048
DETONATION WAVE FORMING MACHINE
Milton R. Johnson, Chicago, and Frank W. Horner, Jr., Park Ridge, Ill., assignors to General American Transportation Corporation, Chicago, Ill., a corporation of New York
Filed Aug. 13, 1964, Ser. No. 389,448
26 Claims. (Cl. 72—56)

The present invention relates to machines for imparting a desired shape to a blank characterized by plastic flow, and more particularly to such machines capable of generating detonation waves that create working pressures for deforming the blank at a high strain rate during the forming thereof.

It is a general object of the invention to provide a machine of improved construction and arrangement that is productive of detonation waves which when impinged upon a blank mounted in front of a die deform the blank at a high strain rate on the order of 100 inch/inch/sec. and greater.

Another object of the invention is to provide a machine of the type set forth that will permit deep drawing of relatively frangible materials that cannot be so formed by conventional forming techniques.

Yet another object of the invention is to provide a machine of the type set forth comprising an elongated tubular casing, a rear wall closing the rear end of the casing, structure for closing the front end of the casing and for mounting the blank with at least a portion of the area of the inner surface thereof in communication with the interior of the casing, a die removably disposed closely adjacent to the outer surface of the mounted blank and in cooperating relation therewith, means for supplying a detonable gas into the casing, and means for igniting the gas adjacent to and forwardly of the rear wall to produce a forwardly traveling flame front in the detonable gas, the casing having a length substantially greater than the cross sectional dimensions thereof so that the forwardly traveling flame front is transformed into a forwardly traveling detonation wave in the detonable gas, the forwardly traveling detonation wave being characterized by a substantial over-pressure and forward travel at supersonic velocity and also being characterized by a planar shock front having a predetermined pressure therein, the impact of the shock front upon the adjacent inner surface of the mounted blank generating a reflected wave that is productive of a working pressure thereupon that is substantially higher than the pressure in the shock front, the working pressure acting upon the adjacent inner surface of the mounted blank deforming the blank at a high strain rate so as to move the same into the die to shape the blank.

Still another object of the invention is to provide a machine of the character described, wherein the walls of the casing are formed essentially of metal of relatively thin gauge, since the detonation wave that is produced therein is not productive of substantial rupturing stresses in the walls of the casing, notwithstanding the overpressure of the detonation wave and the substantial working pressure created therefrom upon striking the mounted blank.

Yet another object of the invention is to provide in a machine of the type set forth an improved detonable gas mixture consisting essentially of propane and oxygen.

In connection with the foregoing object, another object of the invention is to provide in a machine of the character described, an improved detonable gas mixture of propane and oxygen, wherein the advantageous range of the ratio of oxygen to propane is employed for the purpose of maximizing the detonation pressure of the detonation wave produced therein.

Yet another object of the invention is to provide in conjunction with a machine of the character described, an improved system for charging a detonable gas mixture into the casing thereof and for purging gaseous detonation products therefrom.

Still another object of the invention is to provide a machine of the character described embodying therein improved structure for mounting the blank with respect to the front end of the casing and the associated die so that the outer portion of the mounted blank is releasably held to permit drawing thereof into the die forming cavity during the forming of the blank.

In connection with the foregoing object, it is another object of the invention to provide in a machine of the type set forth, an improved die wherein the outer edge of the die forming cavity thereof has a shape that facilitates movement of the outer portion of the blank thereacross during the forming of the blank.

Yet another object of the invention is to provide in a machine of the character described, improved structure for mounting the blank on the front end of the casing including an hermetic seal between the outer portion of the blank and the front end of the casing, and an hermetic seal between the outer surface of the blank and the die.

In connection with the foregoing object, another object of the invention is to provide in a machine of the character described means for initially evacuating the space between the outer surface of the mounted blank and the die to facilitate movement of the blank into the die.

Another object of the invention is to provide a machine of the character described, further comprising fastener means for securing the die to the front end of the casing to equalize the recoil forces upon the rear end of the casing.

Yet another object of the invention is to provide a machine of the type set forth including mechanism for selectively moving the die longitudinally between the operative position and an unloading position, thereby greatly to facilitate the insertion of blanks to be formed therein and the removal of formed blanks therefrom.

Still another object of the invention is to provide a machine of the character described, wherein the mass of the casing is substantially equal to the mass of the die and its mounting structure so as to apply a minimum stress to the fastener means mounting the die on the front end of the casing during the operation of the machine.

Another object of the invention is to provide a modification of the machine described above so that the modified machine can handle heated blanks which would prematurely detonate the detonable gas if brought into contact therewith, the modified machine including a frangible diaphragm in the casing dividing the casing into a rear chamber for holding the detonable gas and a front chamber for housing the heated blank.

In connection with the foregoing object, it is a further object of the invention to provide a machine of the character described, wherein the front chamber of the casing is filled with a gas that is non-reactive with the hot blank during the forming thereof.

Yet another object of the invention is to provide in a machine of the character described, an intermediate section of the casing selectively removable with respect to the rear and front sections thereof and carrying a replacable frangible diaphragm of the character described.

Still another object of the invention is to provide a machine of the character described, and further comprising a simple mechanism for moving the intermediate casing section between its assembled and disassembled positions with respect to the adjacent stationary sections of the casing, thereby greatly to facilitate inspection, cleaning and repair of the casing.

Yet another object of the invention is to provide a machine of the character described, wherein the mechanism mentioned essentially comprises a rack and gear mechanism, so as to preserve the angular relationship and fit in the assembled position of the movable intermediate casing section when the same is moved into its disassembled position.

A further object of the invention is to provide a machine of the character described including rear and front sections joined by a transition section, the front and rear sections having different major cross sectional dimensions so that blanks having relatively smaller and relatively larger surfaces can be formed using a rear casing section of predetermined size.

A further object of the invention is to provide in a machine of the type set forth a diverging transition section interconnecting a front casing section that has larger major cross sectional dimensions than the rear casing section, the transition section being formed substantially as a cone and the inner walls thereof being disposed at an angle with respect to the longitudinal axis of the casing no greater than about 30°.

A still further object of the invention is to provide an improved machine of the character described wherein the transition and front sections of the casing are selectively removable with respect to the rear section thereof, thereby to facilitate the changing of the transition and front sections of the casing to accomodate different sizes and shapes of blanks to be formed.

Still another object of the invention is to provide a machine of the character described, further comprising a simple mechanism for moving the transition and front sections of the casing between the operative and storage positions thereof, thereby greatly to facilitate inspection, cleaning and assembly of the casing.

A still further object of the invention is to provide a machine of the character described, wherein the mechanism mentioned essentially comprises a rack and gear mechanism, so as to preserve the angular relationship and fit in the operative position of the movable transition and front sections when the same are moved into the storage position thereof.

Further features of the invention pertain to the particular arrangement of the elements of the machine, whereby the above-outlined and additional operating features thereof are attained.

The invention, both as to its organization and method of operation, together with further objects and advantages thereof, will best be understood by reference to the following specification, taken in connection with the accompanying drawings, in which:

FIGURE 1 is a fragmentary schematic diagram of a machine for forming blanks and the control system therefor embodying the present invention;

FIG. 2 is an enlarged fragmentary view in horizontal section through the front end of the casing and the die mounted thereon and forming part of the machine of FIG. 1, this view being in the direction of the arrows along the line 2—2 in FIG. 1;

FIG. 3 is a view in horizontal section through a blank and an article formed therefrom, the blank that may be formed using the machine of the present invention being illustrated on the left and the shape of the blank after forming in accordance with the invention being illustrated on the right;

FIG. 4 is a view in vertical section through the portion of the machine illustrated in FIG. 2, substantially as seen in the direction of the arrows along the line 4—4 thereof;

FIG. 5 is an enlarged view in vertical section through the rear portion of the casing of the machine in FIG. 1 as seen in the direction of the arrows along the line 5—5 thereof;

FIG. 8 is a graphic representation of still other performance characteristics of the machine;

FIG. 9 is a plan view of a modification of the machine of FIGS. 1–5, and incorporating therein a removable intermediate section of the casing carrying a frangible diaphragm;

FIG. 10 is a fragmentary side elevational view showing the forward portion of the machine of FIG. 9 and particularly the removable intermediate casing section carrying the frangible diaphragm;

Figure 12:
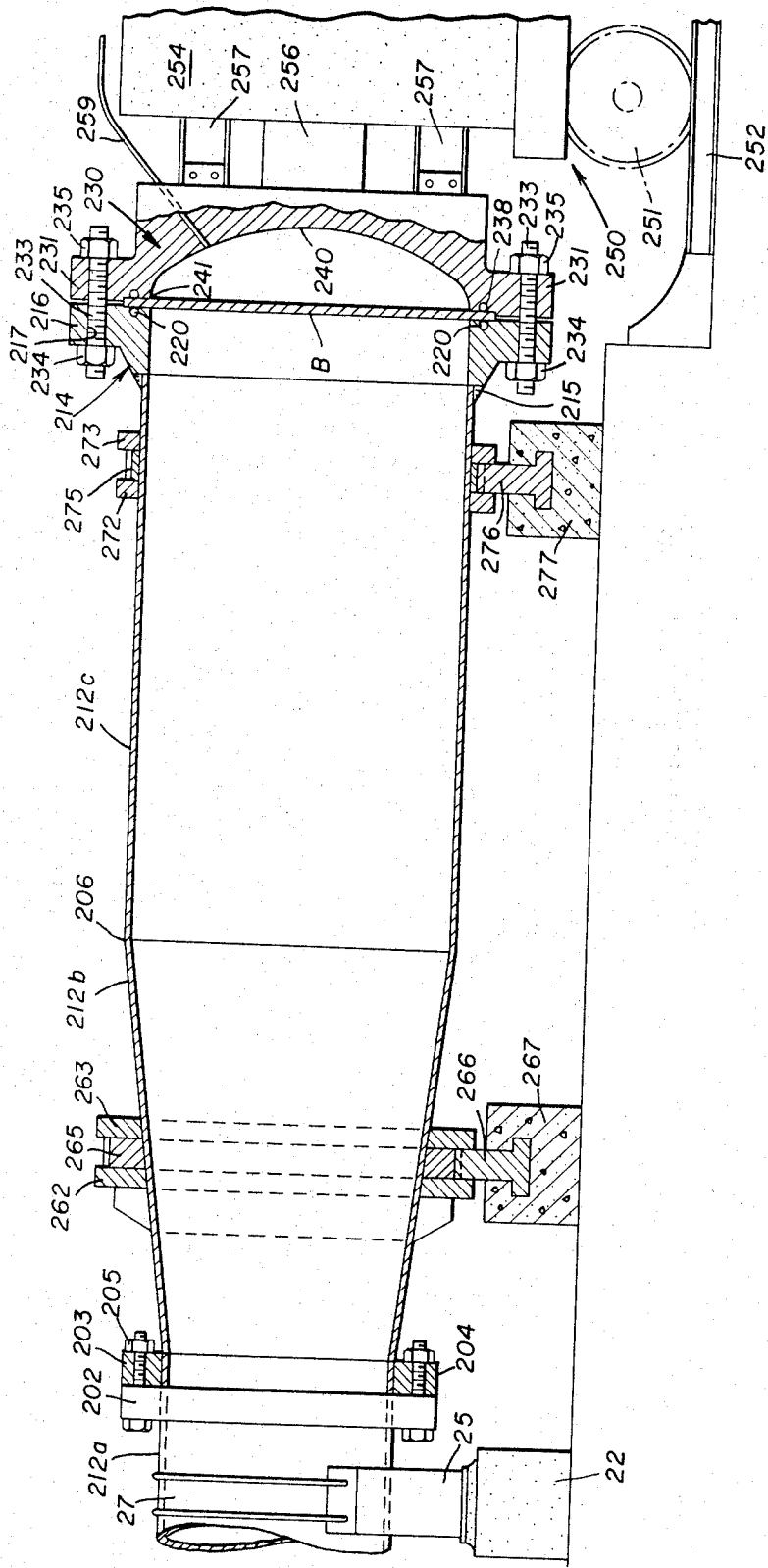

FIG. 11 is a view in vertical section through the front portion of the machine of FIG. 9 as seen in the direction of the arrows along the line 11—11 thereof; and FIG. 12 is an enlarged fragmentary view in vertical section through the forward portion of a second modification of the machine incorporating a transition section therein interconnecting a rear section of smaller cross sectional dimensions and a front section of larger cross sectional dimensions.

Referring now to FIG. 1 of the drawings, there is illustrated a machine 10 and a control system therefor embodying the features of the present invention, the machine 10 including a detonation shock tube 11 that essentially comprises an elongated tubular casing 12 which as illustrated is formed as a single length or section having a substantially circular cross section. The rear end of the casing 12 is closed by a rear wall 13 that is formed generally convex and the front end of the casing 12 has secured thereto a casting 14 as by welding at 15 (see FIG. 2 also), the casting 14 having an internal surface that is formed as a cylinder having a diameter equal to the internal diameter of the casing 12. Extending outwardly from the casting 14 and completely therearound is a mounting flange 16 having a plurality of equiangularly disposed openings 17 therein. The forward face of the casting 14 has a circular recess 18 therein adapted to receive a blank B to be formed, and there further is provided in the recess 18 and concentrically therewith a groove 19 to receive a resilient sealing ring 20 which may be formed, for example, of rubber and is adapted to provide a hermetic seal between the front end of the casing 12 and the rear surface of the blank B. The casing 12 is supported upon a base including a pair of spaced-apart concrete footings 21 and 22 disposed in an underlying support designated by the numeral 23, the concrete footings 21 and 22 carrying steel brackets 24 and 25, respectively, which are attached to securing bands 26 and 27, respectively, that encircle and grip the casing 12 to secure it upon the brackets 24 and 25.

A die generally designated by the numeral 30 is provided to cooperate with the front end of the casing 12, and particularly with the casting 14, so as to impart a predetermined shape to the blank B upon operation of the machine 10. As illustrated in FIGS. 2 and 4, the die 30 includes an outwardly extending flange 31 having a plurality of equiangularly disposed openings 32 disposed therein, the openings 32 cooperatingly matching with the openings 17 in the flange 16 so as to receive therethrough cooperating fastener structures including threaded bolts 33 having nuts 34 and 35, respectively, threadedly engaging the opposite ends thereof and bearing against the adjacent surfaces of the flanges 16 and 31, respectively, the bolts 33 and the nuts 34–35 all cooperating firmly to mount the die 30 upon the forward end of the casing 12 with the blank B disposed between the casting 14 and the die 30. The forward face of the die 30 has a recess 36 therein circular in outline and generally matching the recess 18 in the face of the casting 14, the recess 36 also having therein a groove 37 for receiving a resilient sealing member 38 which may be formed, for example, of rubber and is annular in shape and extends completely around the recess 36 and provides an hermetic seal between the die 30 and the front surface of the blank B. There further is provided in the die 30 a die forming cavity 40 which is illustrated as being generally concave in shape and formed substantially as a section of a sphere and having a major diameter equal substantially to the internal diameter of the casing 12. The outer edge of the die cavity 40 is rounded as at 41 to provide a predetermined radius of curvature over which a portion of the blank B is drawn during the forming thereof using the machine 10.

The die 30 as illustrated is mounted upon a rail car 50 provided with four sets of wheels 51 that are designed to engage tracks 52 mounted on a bed 53. Disposed upon the rail car 50 is a concrete recoil block 54 which carries on the rear surface thereof a bearing plate 55 supporting a rearwardly extending load transfer column 56, the rear end of the load transfer column 56 being securely attached to the front side of the die 30, see FIG. 2. Additional support beams 57 are provided extending from the concrete recoil block 54 to the die 30 to provide additional support therefor. By thus mounting the die 30 upon the rail car 50, the die 30 can be readily moved between the operative position illustrated in FIGS. 1 and 2 and a retracted loading position wherein the die 30 is spaced from the front end of the casing 12 to permit workmen to place the blank B in the operative position thereof and to remove a formed blank from the die 30.

It is preferred that the space between the front surface of the blank B and the die 30 be evacuated during the forming of the blank B, and to this end there has been provided upon the recoil block 54 a vacuum pump 58 that is connected by a conduit 59 with the die forming cavity 40. The vacuum pump 58 may preferably be of the gasoline engine driven type to permit operation thereof independent of other power connections.

Finally, the central portion of the rear wall 13 carries a detonator 70, of any suitable type, disposed in the extreme rear portion of the casing 12. More particularly, the detonator 70 may be of the electrically triggered type, so the same may be readily detonated from the exterior of the shock tube 11 by an operator upon closure of an electric operating circuit therefore, not shown. Specifically, the detonator 70 may essentially comprise a typical dynamite cap of the mercury fulminate type provided with the electrical ignition heater filament, all of conventional construction and arrangement.

Turning now to the control system that is operatively associated with the shock tube 11, there is provided an arrangement for evacuating the air from the casing 12 that essentially comprises a vacuum pump 71 driven by an associated electric drive motor 72. The vacuum pump 71 comprises an inlet connected by a header 73 to the rear portion of the casing 12, and specifically to an exhaust duct 76 and an associated control valve 77 connected to the rear wall 13 and communicating with the interior of the casing 12, and an outlet connected by a pipe 74 to the atmosphere, the header 73 including a manually operable shut-off valve 75. Also, a detonable gas mixture supply arrangement is provided for the shock tube 11 that includes a tube or tank 81 containing gaseous oxygen under substantial gauge pressure, a tube or tank 82 containing liquefied propane under substantial gauge pressure and a manifold 83. The manifold 83 is connected to the rear portion of the casing 12 and communicating with the interior thereof and includes a manually operable shut-off valve 84. The two tubes 81 and 82 are respectively selectively connectible to the manifold 83 by two respectively associated throttling valves 85 and 86.

Further, a purge arrangement is provided for the shock tube 11 that includes a header 88 connected to the rear portion of the casing 12 and communicating with the interior thereof, the header 88 including a manually operable shut-off valve 88a. Further, the purge arrangement includes an air filter 89 that is provided with an air inlet structure 89a, and that communicates with the inlet of a blower 90. The outlet of the blower 90 communicates with the inlet of an air washer 91; the outlet of the air washer 91 communicates with the inlet of a water deentrainer 92; and the outlet of the water deentrainer 92 communicates with the inlet of another blower 93. The outlet of the blower 93 is connected to the inlet of a drier 94; the outlet of the drier 94 is connected to the inlet of a primary heater 95; and the outlet of the primary heater 95 is connected to the inlet of a compressor 96 that is driven by an electric drive motor 96a. The outlet of the compressor 96 is connected to the inlet of a secondary heater 97; and the outlet of the secondary heater 97 is connected to the header 88. The drier 94 and the primary heater 95 respectively house the evaporator 98 and the condenser 99 of a refrigerating machine, also including a compressor 78 driven by an electric drive motor 78a. The outlet of the compressor 78 is connected to the inlet of the condenser 99; the outlet of the condenser 99 is connected by an expansion valve 99a to the inlet of the evaporator 98; and the outlet of the evaporator 98 is connected to the inlet of the compressor 78. The refrigerating machine also contains a charge of refrigerant, such as "F12"; and the secondary heater 97 contains a suitable heating unit, such as a steam coil 97a.

Considering now the general mode of operation of the machine 10 including the detonation shock tube 11 and the associated control system therefor, upon the mounting of the blank B between the casing 14 and the die 30, a detonation chamber is defined by the casing 12 between the rear wall 13 thereof and the rear surface of the blank B, the sealing ring 20 providing an hermetic seal between the casing 12 and the blank B at the front end of the shock tube 11. It may be assumed that the detonation chamber so provided contains a charge of detonable gas (for example, a mixture of propane and oxygen, as explained more fully hereinafter), and that the blank B is in readiness for forming thereof, the space between the blank B and the die 30 having been evacuated. Also, it may be assumed that the shut-off valves 75, 84 and 88a occupy their close positions, the throttling valves 85 and 86 occupy their close positions, and that the detonator 70 is in readiness to be ignited. The operator then closes the electric circuit, not shown, to the detonator 70 so as to effect operation thereof, with the result that the detonable gas contained in the casing 12 is instantaneously ignited immediately adjacent to the front face of the rear wall 13. Ignition of the gas produces a traveling flame front therein due to the burning of the detonable gas, the flame front being essentially spherical in shape under ideal conditions but actually being confused and somewhat chaotic, particularly in large diameter casings. As the gases in the flame front expand, the flame front travels forwardly, and after the flame front has traveled a distance forwardly within the casing 12 equal to a few diameters thereof, the flame front becomes and is formed into a detonation wave. The flame front is propagated essentially at subsonic and sonic velocities and at modest pressures of a few atmospheres. The detonation wave is characterized by a substantial overpressure and forward travel at supersonic and even hypersonic velocities; the detonation wave is further characterized by a planar shock front having a high pressure therein, the shock front being disposed substantially normal to the longitudinal axis of the casing 12. After the required exceedingly short time interval, the detonation wave moves forwardly to the front end of the casing 12 and strikes the adjacent inner surface of the mounted blank B to subject the blank B to the high pressure, high impact and other characteristics of such a shock front. More particularly, the impact of the shock front of the detonation wave upon the adjacent inner surface of the mounted blank B generates a reflected wave that is productive of a working pressure thereon that is substantially higher than the pressure in the shock front, the working pressure acting upon the adjacent inner surface of the mounted blank B deforming the blank at a high strain rate so as to move the same into the die 30 to shape the blank B, all as will be described more fully hereinafter. As a result of the impact of the shock front upon the blank B, it is formed from the shape illustrated to the left in FIG. 3 to that illustrated to the right therein.

Such detonation of the propane-oxygen mixture in the detonation shock tube 11 is productive of such gaseous detonation products as water vapor, carbon dioxide, carbon monoxide, etc.; whereby it is necessary to purge these gaseous products from the shock tube 11 following a "shot" thereof. In order to accomplish this end, the casing 13 is vented to the atmosphere by opening valves 75 and 77 and then the die 30 is removed from the forward end of the casing 12 and the formed blank removed so as to open the front end of the casing 12 to the atmosphere. The vacuum pump 71 is also operated to remove the major portion of the gaseous detonation products from within the casing 12, it being pointed out that the atmospheric air is drawn in to the front end of the casing 12 and is swept therethrough and outwardly through the connection 76 and the manifold 73 and through the vacuum pump 71 to the atmosphere through the pipe 74. Such initial purging of the casing 12 provides a minimum interference with the activity of the workmen at the front end thereof and serves to remove a major portion of the noxious combustion products from within the casing 12. In order to remove the last vestiges of the gaseous detonation products from within the casing 12, and particularly to remove the water vapor therefrom and the water condensed therein, it is desirable positively to purge the casing 12, i.e., to supply a superatmospheric pressure thereto. To this end the valves 75 and 77 are closed and the shut-off valve 88a is opened. Air is taken into the air inlet 89a from the atmosphere, and filtered in the air filter 89, and washed in the air washer 91 and then subjected to water deentrainment in the deentrainer 92; whereby the air supplied to the blower 93 is clean, but substantially 100% saturated with moisture at the ambient temperature. In the drier 94 the temperature of the air is substantially reduced so that substantial moisture is extracted therefrom both by the dew-point action and by the freezing-out action of the evaporator 98. In the primary heater 95 the temperature of the air is elevated slightly higher than the ambient temperature, since the refrigerating machine is operating as a heat-pump. However, the relative humidity of the air to the compressor 96 may be as low as about 10%. The air is further heated by the action of the compressor 96 and is still further heated by the secondary heater 97, since live steam is normally conducted through the steam coil 97a housed in the secondary heater 97; whereby the air supplied to the heater 88 is not only quite hot, having a temperature normally in the general range 150°–200° F., but the same is exceedingly dry, having a relative humidity as low as about 1%.

The blast of hot dry air from the header 88 is injected into the rear end of the casing 12 and proceeds forwardly in the casing 12, absorbing the water vapor and sweeping therethrough any of the combustion products still remaining within the casing 12 and outwardly from the front end thereof. The purging arrangement is very advantageous as the same causes substantially all of the detonation products to be quickly removed from the casing 12 to be transported from the area or site of the shock tube 11 that is occupied by personnel, and prevents the deleterious effects of moisture in the casing 12.

After the purging operation has been carried out in a satisfactory manner, the shut-off valve 88a is closed, and the operation of the purging apparatus is arrested. Then a new blank B to be formed is mounted upon the front end of the casing 12 and the die 30 placed in its operative position; whereby the casing 12 is again closed at the rear end thereof by the rear wall 13 and at the front end thereof by the blank B so as to provide a detonation chamber. The shut-off valves 75 and 77 are then opened and operation of the vacuum pump 71 is initiated. The vacuum pump removes the greater portion of the air from the closed detonation chamber by the reduction of the pressure therein into the general area of $10^{-1}$ mm. Hg; to 10 mm. Hg; thereafter the shut-off valves 75 and 77 are closed and operation of the vacuum pump 71 is arrested. While the interior of the casing 12 is being evacuated, the vacuum pump 58 is also operated to evacuate the space between the front surface of the blank B and the die forming cavity 40.

At this time another charge of propane-oxygen mixture is introduced into the casing 12; and to accomplish this the shut-off valve 84 is opened, and ordinarily the throttling valve 85 is first opened to admit oxygen from the tube 81 into the manifold 83, from which it readily flows into the partially evacuated detonation chamber. After the required admission of oxygen into the detonation chamber, as indicated by the pressure therein, the throttling valve 85 is closed and the throttling valve 86 is opened. The propane from the tube 82 flows into the manifold 83 and thence into the detonation chamber. After the required admission of propane into the detonation chamber, as indicated by the total pressure therein, the throttling valve 86 is closed; and then the shut-off valve 84 is closed. At this time, the detonation chamber defined by the casing 12, the rear wall 13 and the blank B contains another propane-oxygen charge, and the shock tube 11 is fundamentally ready for the next "shot" in the manner described above.

At this point it is noted that any required proportionation of oxygen and propane at any required final pressure of the mixture may be readily obtained in the detonation chamber by first introducing the required oxygen to produce an initial predetermined pressure and then by introducing the required propane to produce the desired final pressure, since this is a simple two-part gas system and the final pressure is necessarily produced by two partial pressures of the two gases involved in the mixture. Thus the chemist may readily calculate the initial pressure that will be produced in the detonation chamber by the desired fraction of oxygen in the final oxygen-propane mixture. Thus, the plan suggested above involving the introduction of oxygen to obtain a desired initial pressure, followed by the introduction of propane to obtain a desired final pressure, automatically produces a fixed oxygen/propane ratio in the mixture, as explained above, and thus greatly simplifies the operation and the control of the shock tube 11, as explained more fully hereinafter.

Figure 6:
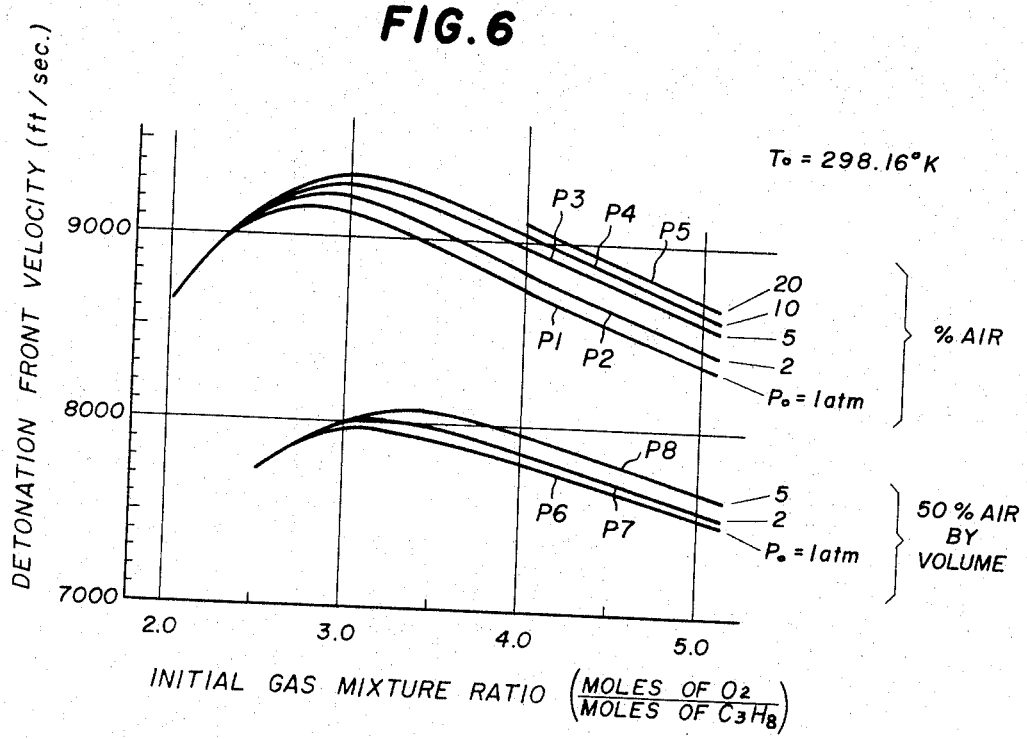
FIG. 6 is a graphic representation of certain performance characteristics of the machine.

Considering now in some particularity the oxygen/propane detonation system, it is pointed out, in connection with FIG. 6, that the detonation front velocity in ft./sec. in the detonation chamber is substantially functional upon the oxygen/propane ratio of the detonable charge of mixture gases employed and slightly functional upon the initial pressure in p.s.i.a. utilized. The data for the various curves P1, P2, P3, P4 and P5 in FIG. 6 were derived utilizing the corresponding initial pressures of 1 atmosphere, 2 atmospheres, 5 atmospheres, 10 atmospheres and 20 atmospheres, respectively, with all of the oxygen contained in the detonable gas being obtained from oxygen gas, and none, or substantially none, from atmospheric oxygen or air. It will be observed that the peak detonation velocity in ft./sec. in the detonation chamber increases slightly with increasing final pressure in atmospheres; whereas, in each case, the detonation velocity in ft./sec. is more or less maximized at a ratio of oxygen/propane in the rather narrow band 2.5 to 3.5. Hence, for a maximum peak detonation velocity in the detonating chamber, in the example disclosed, the ratio of oxygen/propane should be about 3.0. Of course, the maximum detonation velocity increases with increasing initial pressure. For example, with the initial pressure of 10 atmospheres and with the oxygen/propane of 3.0, the detonation velocity is approximately 9,350 ft./sec. as illustrated by the curve P4 in FIG. 6.

Also referring to FIG. 6, the curves labeled P6, P7 and P8 therein were derived from data utilizing corresponding initial pressures of 1 atmosphere, 2 atmospheres and 5 atmospheres, respectively, utilizing 50% air by volume in the detonable gas, whereby to introduce a substantial amount of essentially inert nitrogen gas into the detonation chamber. It will be observed that the final detonation velocity achieved at each initial pressure in atmospheres is substantially lower, for example, the detonation velocities represented by the curve P6 at 1 atmosphere initial pressure are substantially less than the corresponding detonation velocities of the curve P1 also at one atmosphere initial pressure for like corresponding initial oxygen/methane ratios. However, the peak detonation velocity in ft./sec. in the detonation chamber also increases slightly with increasing initial pressure, and the detonation velocity in ft./sec. is more or less maximized at a ratio of oxygen/propane in a rather narrow band 3.0–4.0. The detonation velocity is, of course, increased with increasing initial pressure, for example, with the initial pressure of 5 atmospheres and with the oxygen/propane ratio of 3.5, the detonation velocity is approximately 8,075 ft./sec., as illustrated by the curve P8 in FIG. 6.

Figure 7:
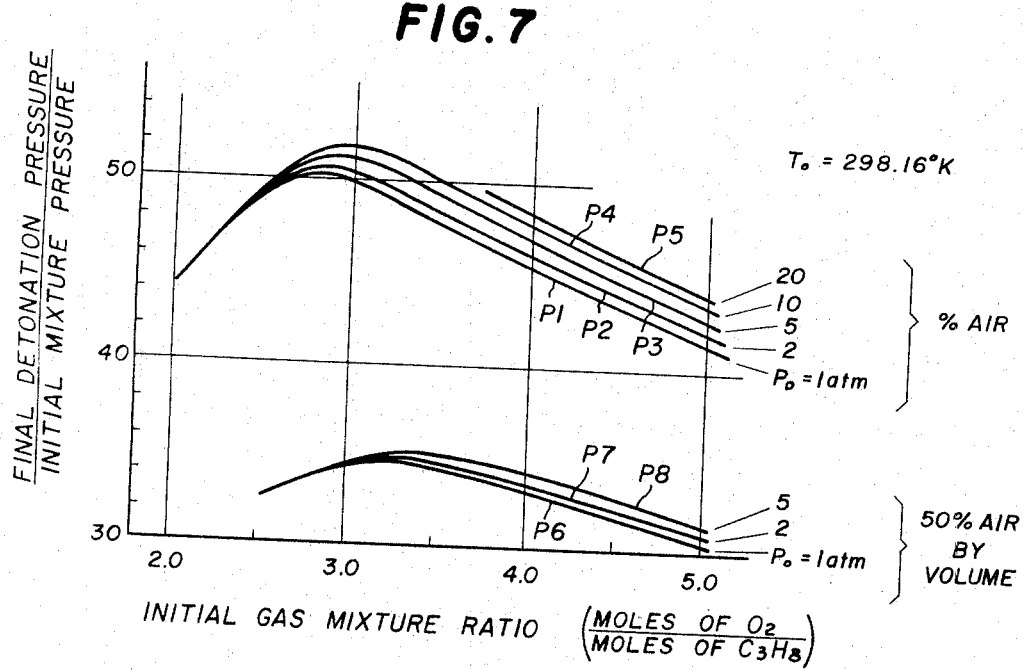
FIG. 7 is a graphic representation of other performance characteristics of the machine.

Referring to FIG. 7 it is pointed out that the ratio of the final detonation pressure in atmospheres to the initial mixture pressure in the detonation chamber is substantially functional both upon the oxygen/propane ratio of the detonable charge of mixture gases employed and upon the initial pressure in atmospheres utilized. The data for the curves P1, P2, P3, P4 and P5 in FIG. 7 were derived utilizing the respective initial pressures of 1 atmosphere, 2 atmospheres, 5 atmospheres, 10 atmospheres and 20 atmospheres, respectively, wherein all of the oxygen in the detonable gas was obtained from oxygen gas. It will be observed that the ratio of the peak detonation pressure to the initial mixture pressure in the detonation chamber is more or less directly proportional to the initial pressure in atmospheres; whereas, in each case, the peak ratio is more or less maximized at a ratio of oxygen/propane in the rather narrow band 3.0 to 5.0. Hence, for a maximum ratio of final detonation pressure to initial mixture pressure in the detonation chamber, in the example disclosed, the ratio of oxygen/propane should be about 3.0. Of course, the ratio is increased with increasing initial pressure. For example, with the initial pressure of 10 atmospheres and with the oxygen/propane ratio of 3.0, the ratio of the final detonation pressure to the initial mixture pressure is approximately 52, as illustrated by the curve P4 in FIG. 7.

Also referring to FIG. 7, the curves labeled P6, P7 and P8 therein were derived from data utilizing corresponding initial pressures of 1 atmosphere, 2 atmospheres and 5 atmospheres, respectively, utilizing 50% air by volume in the detonable gas, whereby to introduce a substantial amount of essentially inert nitrogen gas into the detonation chamber. It will be observed that the ratio of the final detonation pressure to the initial mixture pressure achieved at each initial pressure in atmospheres is substantially lower, for example, the ratios represented by the curve P6 at 1 atmosphere initial pressure are substantially less than the corresponding ratios represented by the curve P1 also at 1 atmosphere initial pressure for like corresponding initial oxygen/methane ratios. However, the ratio of the final detonation pressure to the initial mixture pressure also increases slightly with increasing initial pressure and is maximized at a ratio of oxygen/propane in the rather narrow band 3.0 to 4.0. The ratio of the final detonation pressure to the initial mixture pressure is, of course, increased with increasing initial pressure, for example, with the initial pressure of 5 atmospheres and with the oxygen/propane ratio of 3.5, the ratio of the final detonation pressure to the initial mixture pressure is approximately 35 as illustrated by the curve P8 in FIG. 7.

Referring to FIG. 8 of the drawings, the distribution of pressure along the length of the casing 12 and between the rear wall 13 thereof and the blank B at the front end thereof is illustrated, the distance being measured in terms of diameters of the casing 12 and the pressure being measured in atmospheres, the pressure distribution being shown for 6 different time intervals after detonation respectively designated as graphs A, B, C, D, E and F. In FIG. 8A, there is plotted the pressure distribution a short time interval after detonation at the rear wall 13, the pressure in the rear of the casing being substantially higher than atmospheric pressure due to the pressure in the flame front F produced by the burning of the detonable gas, the flame front F being essentially spherical at this time. At a later time illustrated in FIG. 8B, the flame front F has progressed through the detonable gas and down the casing 12 a distance equal to about two diameters of the casing 12, the flame front F still being substantially spherical but a characteristic distribution of pressures similar to that of a detonation wave beginning to appear. By the time the flame front has reached the point illustrated in FIG. 8C, namely, a distance equal to three diameters from the rear wall 13, the flame front has become a detonation wave, the distance between the point of detonation and the point at which the detonation wave forms being known as the "induction distance," the induction distance being on the order of a few times the diameter of the casing 12 in which the detonable gas is contained. The flame front F in FIGS. 8A and 8B is propagated essentially at subsonic and sonic velocities and at a modest pressure on the order 5–10 atmospheres. The detonation wave by contrast travels at supersonic and even hypersonic velocities on the order of 8,500 to 9,500 ft./sec. (see FIG. 6 also) as contrasted to the speed of sound in such a mixture which is on the order of 1,000–1,100 ft./sec. the propagation velocity of the detonation wave is in fact equal to the sum of the flow velocity plus the speed of sound in the heated gas in the detonation wave.

The detonation wave illustrated in FIG. 8C includes a planar shock front S which is disposed substantially perpendicular to the longitudinal axis of the casing 12, the shock front S traveling through the detonable gas at the velocity of the detonation wave. In front of the shock front S, i.e., to the right in FIG. 8C, is the "zone of quiet," no disturbance from the detonation wave being present therein and the pressure thereof being substantially that prior to detonation, for example 2 atmospheres. Immediately behind the shock front S is the reaction zone, the pressure in the reaction zone being slightly less than that at the shock front S as indicated by the downwardly directed pressure curve. Immediately behind the reaction zone is an expansion zone in which the pressure gradually falls until a point Z of zero flow velocity is reached, i.e., the gases are substantially quiescent at this point; and behind the point Z of zero flow velocity the pressure is substantially constant. In a detonable gas at an initial pressure of about 2 atmospheres, the pressure at the shock front may be, for example, 24 atmospheres and the pressure may fall in the expansion zone to a value of about 9 atmospheres at the point Z of zero flow velocity. The temperature within the reaction zone is very high and may be on the order of 3800° C., the temperature dropping through the expansion region toward the point Z of zero flow velocity.

A detonation wave is self-propagating within the detonable gas and is characterized by substantial overpressure and forward velocity at supersonic velocity. Both the detonation wave and the shock front S associated therewith quickly reform if disturbed, whereby it is not necessary to take any special precaution with respect to the smoothness of the inner surface of the casing 12. If materially disturbed, the detonation wave and the shock front S will substantially reform after traveling a distance as short as about one diameter of the casing 12.

Restating the above explained relationship in more general terms, the casing 12 must have a length longitudinally thereof that is at least three times the average lateral dimension or diameter thereof in order to provide an "induction distance" for the purpose of transforming the forwardly traveling flame front into a forwardly traveling detonable gas contained in the casing 12, as clearly illustrated in FIGS. 8A to 8C, inclusive.

Referring to FIGS. 8D and 8E it will be seen that as the shock front S moves along the casing 12 toward the blank B, the pressure therein remains constant and the general shape of the curve representing the decrease of pressure from the shock front S to the point Z of zero velocity remains substantially the same; however, the shock front S travels at a substantially higher velocity than does the point Z of zero velocity, whereby the distance between the shock front S and the point Z of zero velocity is continually increasing; and the slope of the curve representing the decrease in pressure through the expansion zone is gradually decreasing so that there is an accumulation of energy represented roughly by the area beneath the pressure curve between the shock front S and the point Z of zero flow velocity.

Upon the impact of the shock front S upon the blank B, a reflected wave is generated that tends to move rearwardly toward the rear wall 13; however, the reflected wave immediately meets the gases within the reaction zone and the momentum thereof represented by the flow velocity in the reaction zone and the expansion region reacting against the reflected wave immediately boosts the pressure exerted against the blank B to a value on the order of 2.5 times the pressure at the shock front S, for example, to a value of 60 atmospheres when the pressure in the shock front S is 24 atmospheres as illustrated. Accordingly, the working pressure applied to the blank B is 60 atmospheres, the peak working pressure being independent of the length of the casing 12, provided the length thereof is at least a few diameters so as to embody therein a length equal to at least the "induction distance" for the detonable gas used.

The working pressure striking the blank B applies an impulse thereto that causes an acceleration thereof toward the die forming cavity 40. The magnitude of the impulse is dependent fundamentally upon the working pressure applied thereto but is also a function of the distance between the shock front S and the point Z of zero flow velocity. Since the pressure across the shock front S is substantially constant and uniform there is a constant and uniform working pressure applied to the rear surface of the blank B, and it is also believed that the working pressure continues to be applied substantially normal to the blank B throughout the area thereof during the subsequent shaping thereof. The acceleration of the material in the blank B cause a deformation thereof and applies thereto a strain, the strain being applied at a high rate, typical strain rates being on the order of about 100 inch/inch/sec. and even as high as 1,000/inch/inch/sec. At such high strain rates, many materials will stretch and be deformed without breaking almost twice as much as when the strain rate is substantially less. For example, hard to form metals have been successfully formed using machine 10 of the present invention including 2219 aluminum, 7002 aluminum, 7039 aluminum, 7106 alumnium, 321 stainless steel, 6AL–4V titanium alloy, LA141A lithium-magnesium alloy, and beryllium and alloys thereof.

When the working pressure first is applied to the rear surface of the blank B, see FIGS. 2 and 3, the working pressure is distributed over the central portion of the inner surface, i.e., the portion of the inner surface lying within the inner wall of the casting 14, the outer portion of the inner surface of the blank B, i.e., that portion lying radially outwardly beyond the inner wall of the casting 14, having substantially no pressure applied thereto. As the central portion of the blank B is accelerated toward the die cavity 40, the outer portion of the blank B tends to be drawn into the die 30. Accordingly, the manner of gripping the periphery of the blank B extending beyond the area of the die forming cavity 40 is important and the width or radial extent of the outer portion or holding flange of the blank B is likewise important. It further is desirable to have a simple and rounded juncture 41 between the die forming cavity 40 and the flange 31 so that the material of the blank B drawn thereacross is not unduly hindered in such movement or injured thereby. In some cases, the outer portion or holding flange of the blank B must be held rather tightly, for if it is not, the acceleration of the material in the outer portion is such that the material continues inwardly into the die after the blank has been fully formed to provide an inwardly directed portion around the edge of the formed piece. In general, where provision is made for adequate flange material around the edge of the die, the outer portion or holding flange of the blank B need not be held, except to the extent necessary to create the hermetic seal between the front end of the casing 12 and the rear surface of the blank B by means of the sealing ring 20.

Referring to FIG. 3, it will be seen that the blank B before forming has a predetermined external diameter. After forming, the blank B has been shaped into a domed piece including a generally part-spherical dome 45 and a radially extending flange 46, the external diameter of the flange 46 being slightly less than the external diameter of the blank B due to the drawing of the material of the blank B into the die 40 during the forming thereof.

When both ends of the casing 12 are closed during the detonation of the detonable gas therein, there is substantially no recoil of the shock tube 11, any unbalance in the forces applied to the opposite ends thereof being for a very short period of time that may be measured in milliseconds or less. Accordingly, there is no necessity for a heavy anchoring structure. In order to minimize the stress applied to the bolts 33 during the operation of the machine 10, it is desirable that the mass of the casing 12 and the various structures attached thereto be substantially equal to the mass of the die 30 and the material connected thereto including particularly the rail car 50. To this end, the concrete recoil block 54 has the weight thereof adjusted to provide the desired balance of masses and forces mentioned.

Although the pressures produced in the shock front associated with the detonation wave and the working pressure applied to the blank B are substantial, there are no undue explosive pressures applied to the shock tube 11, and specifically to the casing 12 and the rear end 13 thereof. Accordingly, relatively light gauge materials may be used in the construction of the shock tube 11, the wall of the casing 12 having a thickness, for example, of 1½" when the shock tube has an integral diameter of 6' 6".

Turning now to FIGS. 9–11, inclusive, there is illustrated a first modification of the machine 10 which is particularly adapted to form work pieces or blanks B that would be adversely affected by the detonable gas, or conversely work pieces or blanks B that would adversely affect the detonable gas, whereby isolation between the detonable gas within the casing and the blank B is desirable. For example, when forming hot blanks that are at temperatures that would ordinarily detonate the gas within the casing, it is necessary that there be no contact between the detonable gas mixture and the blank prior to detonation of the gas. To this end a frangible diaphragm has been interposed between the detonable gas and the blank B, and mechanism has been provided for readily repairing the frangible diaphragm between successive "shots" of the machine. In the machine of FIGS. 9–11, the casing 12 comprises the components 12a, 12b1, 12b2 and 12c. Specifically, the rearmost casing section 12a terminates in a ring 101 that encircles the front end thereof and cooperates with the rear end of the removable casing section 12b1 or 12b2, as the case may be. Two of the casing sections 12b1 and 12b2 are provided, as a matter of convenience, so that one of the removable casing sections, such as the casing section 12b1, may be in the assembly of the casing 12, while the other of the removable casing sections, such as the section 12b2, is undergoing preparation for reuse. The two casing sections 12b1 and 12b2 are identical, and each thereof carries one of the frangible partitions 102 which may be formed of any suitable frangible materials, such as light-gauge metal, plastic sheet material, etc. Specifically, the casing section 12b1 comprises two identical parts 111 and 121; the part 111 including a pair of left-hand rings 112 and 113 arranged in longitudinally spaced relation and a right-hand ring 114; and the part 121 including the pair of right-hand rings 122 and 123 arranged in longitudinally spaced-apart relation and a left-hand ring 124. The two rings 114 and 124 are suitably removably secured together, as by an annular series of bolts, not shown, with the frangible partition 102 securely clamped in place therebetween; and the two rings 112 and 122 are respectively secured to the two rings 101 and 103, respectively carried by the adjacent casing sections 12a and 12c, as by two annular series of bolts, not shown.

A ring gear 115 is rigidly secured in place between the rings 112 and 113 to the part 111; and a ring gear 125 is secured in place between the rings 122 and 123 to the part 121; and the two ring gears 115 and 125 are respectively supported by two laterally extending and spaced-apart racks 116 and 126 that are respectively carried by two concrete footings 117 and 127, respectively, anchored in place in the earth.

Thus, the casing sections 12b1 and 12b2 are selectively movable between operative and repair positions, as respectively illustrated by the positions of the casing sections 12b1 and 12b2, along the racks 116 and 126, thereby to facilitate ready replacement of the ruptured partitions 102 in normal use of the shock tube in the manner previously explained. The arrangement is very advantageous, since the cooperation between the ring gears 115, 125 and the racks 116, 126 preserves the angular positions of fit of the casing sections 12b1, 12b2, notwithstanding the lateral rolling of the casing sections 12b1 and 12b2 into their repair positions. In other words, when one of the casing sections 12b1 or 12b2 is rolled into its operative position with respect to the adjacent ends of the casing sections 12a and 12c, the bolts, not shown, may be immediately placed in the cooperating rings 101–112 and 103–122 for the reason noted above. It will be understood that the casing section 12c is supported upon a suitable footing such as the footing 127 carrying a steel bracket 25a carrying a securing band 27a firmly to mount the casing section 12c independently of the casing sections 12a, 12b1 and 12b2, but in proper relationship to cooperate with the associated one of the associated casing sections 12b1 or 12b2 when placed in the operative position thereof.

In the operation of the machine of FIGS. 9–11, the detonation chamber defined between the rear wall 13 and the frangible diaphragm 102 is filled with detonable gas in the manner which has been described above. The chamber defined between the frangible diaphragm 102 and the blank B is filled with a gas that is non-reactive with respect to the blank B. For example, if the blank B is heated, the chamber between the frangible diaphragm 102 and the blank may be filled with an insulating gas that is also non-reactive with the metal of the blank B at its high temperature, a suitable gas, for example, being nitrogen, argon or some other noble gas. The frangible diaphragm 102 may be a thin synthetic organic film since the pressure on the opposite sides thereof prior to detonation could be equalized, the gas being supplied into the isolating chamber through an opening 130 provided with suitable valving, not shown.

Upon detonation of the gas within the detonation chamber, a detonation wave is established therein having an accompanying shock front of the type which has been described above, the shock front having a high overpressure and having a forward travel at supersonic and even hypersonic velocity. After the required exceedingly short time interval, the detonation shock front moves forwardly and rupture the partition 102, producing a blast wave or shock wave in the gas in the isolating chamber disposed between the partition 102 and the blank B. The shock wave has a substantially planar shock front disposed substantially normal to the longitudinal axis of the casing 12, the shock front being at a high overpressure and moving forwardly at supersonic and even hypersonic velocity through the gas in the isolating chamber. The impingement of the shock front of the forwardly traveling shock wave upon the adjacent inner surface of the blank generates the reflected wave that is protective of a working pressure supplied to the blank B that is substantially higher than the overpressure of the shock wave. The high working pressure acting upon the adjacent inner surface of the blank B deforms the blank at a high strain rate so as to move the same into the die 30 to shape the blank B, all as has been described more fully hereinabove.

Turning now to FIG. 12, there is shown a second modification of the machine wherein larger blanks B can be handled utilizing the same rear portion of the casing 12 and the associated control systems therefor. More particularly, the casing 12 comprises a rear casing section 212a, a transition casing 212b and a front casing 212c. The forward end of the rear casing section 212a is supported upon the bracket 25 carried by the footing 22, and carries on the foremost portion thereof an annular ring 202 extending outwardly therefrom and having an annular series of openings therethrough to receive cooperating bolts 203. The rear end of the transition section 212b has an outwardly extending ring 204 thereon having openings therethrough receiving the bolts 203 therein, suitable nuts 205 being provided so as to clamp the rings 202 and 203 together thus to join the forward end of the rear casing section 212a and the rear end of the transition casing section 212b. The forward end of the transition casing section 212b is joined as by welding to the rear end of the front casing section 212c as at 206 and the forward end of the front casing section 212c carries a casting 214 which is of the same construction as the casting 14, and accordingly, like reference numerals in the 200 series have been applied to like parts thereof. The casting 214 in turn cooperates with a die 230 which is of the same construction as the die 30, and accordingly, like reference numerals in the 200 series have been applied to like parts thereof.

The exterior of the transition section 212b carries a pair of rings 262 and 263 arranged in longitudinal spaced-apart relation and having secured and placed therebetween a ring gear 265. The front casing section 212c carries a pair of rings 272 and 273 arranged in longitudinally spaced-apart relation and having secured and placed therebetween a ring gear 275. The two ring gears 265 and 275 are respectively supported by two laterally extending and longitudinally spaced-apart racks 266 and 276 that are respectively carried by two concrete footings 267 and 277 respeectively securely anchored in place in the earth.

Thus, the combination of the transition section 212b and the front section 212c is selectively movable between the operative position illustrated in FIG. 12 and a storage position to facilitate replacement thereof by other front sections 212c having different internal diameters so as to permit the forming of different size blanks B thereby. The arrangement is very advantageous, since the cooperation between the ring gears 265, 275 and the racks 267, 277 preserves the angular positions fit of the casing sections 212b–212c, notwithstanding the lateral rolling of the casing sections into their storage position.

It is further pointed out that the length of the rear casing section 212a is preferably equal to at least several diameters thereof so as to provide an adequate "induction distance" for transforming the flame fronts into detonation waves therein. In the operation of the machine of FIG. 12, the casing is filled with a detonable gas as has been described above and the gas is detonated at the rear wall using the detonator 70. The initial flame front is transformed into a detonation wave having a substantially planar shock front within the rear casing section 212a, and consequently a substantially planar shock front is presented to the rear end of the transition section 212b. The detonation wave and accompanying planar shock front is transformed by the transition section 212b, the planar shock front becoming essentially spherical but still being characterized by substantial overpressure and forward travel at supersonic and even hypersonic velocity. When the detonation wave and the accompanying spherical shock front propagated through the transition section 212b enters the front casing section 212c, the character thereof is again transformed, the tendency being to convert the essentially spherical shock front into a planar shock front disposed substantially normal to the longitudinal axis of the front casing section 212c. After traveling a distance equal to substantially two to three tube diameters within the front casing section 212c, the planar character of the shock front is re-established, and a planar working pressure wave is applied to the inner surface of the blank B, whereby to form the blank B as has been described in detail hereinabove.

As illustrated, the diameter of the front casing section 212c is substantially larger than the inner diameter of the rear casing section 212a, and the transition section 212b is in the form of a section of a right cone having a smaller inner diameter equal substantially to the inner diameter of the rear casing section 212a and having a larger inner diameter equal substantially to the internal diameter of the rear of the front casing section 212c. Accordingly, the transition section 212b is diverging from the forward end of the casing section 212a to the rear end of the casing section 212c, and the angle between an element of the wall of the transition section 212b and the axis thereof and the axis of the casing 12 is approximately 7°. It has been found that this angle of divergence can be substantially smaller or can be substantially greater and, for example, may be as great as about 30°, without interfering with the proper operation of the machine. A wide variety of sizes of blanks B can be shaped using the same rear casing section 212a and associated control apparatus by providing a plurality of the removable transition and front casing sections.

In view of the foregoing, it is apparent that there has been provided an improved machine including a detonation shock tube for imparting a desired shape to blanks, and specifically such machines capable of generating detonation waves that create working pressure for deforming the blank at a high strain rate, the high strain rates being on the order of 100 inch/inch/sec. and greater. As a consequence the machine of the present invention can form an even deep draw relatively frangible materials that cannot be so formed by conventional forming techniques. Further, the construction and arrangement of the detonation shock tube is of improved and simplified character, thereby accommodating the forming of blanks without the necessity of unduly heavy structure and without the necessity of heavy recoil abutments. The machine further incorporates an improved die construction and an improved structure for mounting the blank at the end of the detonation shock tube and in front of the die, structure being provided also to produce an hermetic seal between the blank of the casing and an hermetic seal between the blank and the die. A modification of the machine has been provided that can handle heated blanks and other blanks which cannot be brought into contact with the detonable gas, structure being provided to present a frangible diaphragm between the detonable gas and the blank, and mechanism being provided to faciliate replacement of the frangible diaphragm between successive "shots" of the machine. In yet another embodiment of the invention the casing is provided with rear sections and front sections and an intermediate transition section, that front section having major cross sectional dimensions the differ from those of the rear section, the transition section and the front section being removable and replaceable so that different sizes of blanks may be formed utilizing the machine.

While there has been provided what is at present considered to be certain preferred embodiments of the invention, it will be understood that various modifications may be made therein, and it is intended to cover in the appended claims all such modifications that fall within the true spirit and scope of the invention.

What is claimed is:

1. A machine for imparting a desired shape to a blank characterized by plastic flow; said machine comprising an elongated and longitudinally extending tubular casing, a rear wall closing the rear end of said casing, structure for closing the front end of said casing and for mounting the blank with at least a portion of the area of the inner surface thereof in communication with the interior of said casing, a die removably disposed closely adjacent to the outer surface of the mounted blank and in cooperating relation therewith, means for supplying a detonable gas into said casing, and means for igniting the gas adjacent to and forwardly of said rear wall to produce a forwardly traveling flame front in the detonable gas, said casing having a length that is at least three times the average lateral dimension thereof so as to provide an induction distance for the purpose of transforming the forwardly traveling flame front into a forwardly traveling detonation wave in the detonable gas, the forwardly traveling detonation wave being characterized by a substantial overpressure and forward travel at supersonic velocity and also being characterized by a planar shock front having a predetermined high pressure therein, the impact of the shock front upon the adjacent inner surface of the mounted blank generating a reflected wave that is productive of a working pressure thereupon that is substantially higher than the pressure in the shock front, the working pressure acting upon the adjacent inner surface of the mounted blank deforming the blank at a high strain rate so as to move the same at a high velocity into the die to shape the blank.

2. The machine set forth in claim 1, wherein said tubular casing has a substantially uniform circular cross section from the rear end thereof to the front end thereof.

3. A machine set forth in claim 1, wherein the high strain rate applied to the blank by the working pressure acting upon the adjacent inner surface thereof being at least about 100 inch/inch/sec.

4. The machine set forth in claim 1, wherein the detonable gas essentially comprises a gaseous combustible substance and a gaseous oxidizing substance.

5. The machine set forth in claim 1, wherein the detonable gas essentially comprises a mixture of propane and oxygen.

6. The machine set forth in claim 1, wherein the detonable gas essentially comprises a mixture of oxygen and propane, the molar ratio between oxygen and propane in the mixture being in the general range 2 to 5.

7. A mechine for imparting a desired shape to a blank characterized by plastic flow; and machine comprising an elongated and longitudinally extending tubular casing, a rear wall closing the rear end of said casing, structure for closing the front end of said casing and for mounting the blank with at least a portion of the area of the inner surface thereof in communication with the interior of said casing, a die removably disposed closely adjacent to the outer surface of the mounted blank and in cooperating relation therewith, means for initially evacuating air from said casing, means for supplying a detonable gas into said casing, means for igniting the gas adjacent to and forwardly of said rear wall to produce a forwardly traveling flame front in the detonable gas, said casing having a length that is at least three times the average lateral dimension thereof so as to provide an induction distance for the purpose of transforming the forwardly traveling flame front into a forwardly traveling detonation wave in the detonable gas, the forwardly traveling detonation wave being characterized by a substantial overpressure and forward travel at supersonic velocity and also being characterized by a planar shock front having a predetermined high pressure therein, the impact of the shock front upon the adjacent inner surface of the mounted blank generating a reflected wave that is productive of a working pressure thereupon that is substantially higher than the pressure in the shock front, the working pressure acting upon the adjacent inner surface of the mounted blank deforming the blank at a high strain so as to move the same at a high velocity into the die to shape the blank, and means for subsequently supplying air into said casing so as to purge therefrom gaseous detonation products.

8. The machine set forth in claim 7, wherein the purging air supplied into said casing for purging the gaseous detonation products therefrom is drawn into the front end thereof and exhausted outwardly therefrom adjacent to the rear end thereof.

9. A machine for imparting a desired shape to a blank characterized by plastic flow; said machine comprising an elongated and longitudinally extending tubular casing, a rear wall closing the rear end of said casing, structure for closing the front end of said casing and for mounting the blank with the inner surface of the central portion thereof in communication with the interior of said casing and with the outer portion thereof extending outwardly from and around the central portion, a die removably disposed at the front end of said casing and having a die forming cavity therein disposed closely adjacent to the outer surface of the central portion of the mounted blank and in cooperating relation therewith, means for releasably holding the outer portion of the mounted blank to permit drawing of the outer portion into said die forming cavity during the forming of the blank, means for supplying a dontable gas into said casing, and means for igniting the gas adjacent to and forwardly of said rear wall to produce a forwardly traveling flame front in the detonable gas, said casing having a length that is at least three times the average lateral dimension thereof so as to provide an induction distance for the purpose of transforming the forwardly traveling flame front into a forwardly traveling detonation wave in the detonable gas, the forwardly traveling detonation wave being characterized by a substantial overpressure and forward travel at supersonic velocity and also being characterized by a planar shock front having a predetermined pressure therein, the impact of the shock front upon the adjacent inner surface of the mounted blank generating a reflected wave that is productive of a working pressure thereupon that is substantially higher than the pressure in the shock front, the working pressure acting upon the adjacent inner surface of the mounted blank deforming the blank at a high strain rate so as to move the central portion thereof and part of the outer portion thereof at a high velocity into the die forming cavity to impart a desired shape to the blank.

10. The machine set forth in claim 9, wherein the outer edge of said die forming cavity has a predetermined radius to facilitate the movement of the outer portion of the blank thereacross during the forming of the blank.

11. The machine set forth in claim 9, and further comprising means for providing an hermetic seal between the outer portion of the blank and the mounting structure to seal the front end of said casing.

12. The machine set forth in claim 9, and further comprising means for providing an hermetic seal between the outer surface of the blank and said die to seal the space between the outer surface of the blank and said die, and means for initially evacuating the space between the outer surface of the mounted blank and said die to facilitate movement of the blank into the die forming cavity.

13. A machine for imparting a desired shape to a blank characterized by plastic flow; said machine comprising an elongated and longitudinally extending and substantially horizontally disposed tubular casing, a rear wall closing the rear end of said casing, structure for closing the front end of said casing and for mounting the blank with at least a portion of the area of the inner surface thereof in communication with the interior of said casing, a die selectively removable with respect to the front end of said casing, fastener means for securing said die to the front end of said casing closely adjacent to the outer surface of the mounted blank and in cooperating relation therewith, means for supplying a detonable gas into said casing, and means for igniting the gas adjacent to and forwardly of said rear wall to produce a forwardly traveling flame front in the detonable gas, said casing having a length that is at least three times the average lateral dimension thereof so as to provide an induction distance for the purpose of transforming the forwardly traveling flame front into a forwardly traveling detonation wave in the detonable gas, the forwardly traveling detonation wave being characterized by a substantial overpressure and forward travel at supersonic velocity and also being characterized by a planar shock front having a predetermined high pressure therein, the impact of the shock front upon the adjacent inner surface of the mounted blank generating a reflected wave that is productive of a working pressure thereupon that is substantially higher than the pressure in the shock front, the working pressure acting upon the adjacent inner surface of the mounted blank deforming the blank at a high strain rate so as to move the same at a high velocity into the die to shape the blank.

14. The machine set forth in claim 13, and further comprising mechanism for selectively moving said die longitudinally between an operative position adjacent to the front end of said casing and disposed closely adjacent to the outer surface of the mounted blank in cooperating relation therewith and an unloading position displaced from the front end of said casing, said mechanism being operative to move said die between its operative and unloading positions and to preserve the locations of longitudinal and circumferential fit of said die with respect to the adjacent front end of said casing when said die is returned into its operative position.

15. The machine set forth in claim 13, wherein the mass of said casing is equal substantially to the mass of said die to provide a minimum stress on said fastener means.

16. A machine for imparting a desired shape to a blank characterized by plastic flow; said machine comprising an elongated and longitudinally extending tubular casing, a rear wall closing the rear end of said casing, structure for closing the front end of said casing and for mounting the blank with at least a portion of the area of the inner surface thereof in communication with the interior of said casing, a die removably disposed closely adjacent to the outer surface of the mounted blank and in cooperating relation therewith, a frangible diaphragm in said casing intermediate the ends thereof dividing said casing into a rear chamber and a front chamber, means for supplying a detonable gas into said rear chamber, and means for igniting the gas adjacent to and forwardly of said rear wall to produce a forwardly traveling flame front in the detonable gas in said rear chamber, said rear chamber having a length that is at least three times the average lateral dimension thereof so as to provide an induction distance for the purpose of transforming the forwardly traveling flame front into a forwardly traveling detonation wave in the detonable gas before it reaches said frangible diaphragm, the forwardly traveling detonation wave being characterized by a substantial overpressure and forward travel at supersonic velocity and also being characterized by a planar shock front having a predetermined high pressure therein, said shock front rupturing said frangible diaphragm and producing a forwardly traveling shock wave in said front chamber, the forwardly traveling shock wave being characterized by a substantial overpressure and forward travel at supersonic velocity and also being characterized by a planar shock front having a given high pressure therein, the impact of the shock front of the forwardly traveling shock wave upon the adjacent inner surface of the mounted blank generating a reflected wave that is productive of a working pressure thereupon that is substantially higher than the overpressure of the shock wave, the working pressure acting upon the adjacent inner surface of the mounted blank deforming the blank at a high strain rate so as to move the same at a high velocity into the die to shape the blank.

17. The machine set forth in claim 16, wherein said front chamber of said casing is filled with a gas that is non-reactive with the blank during the forming thereof.

18. A machine for imparting a desired shape to a blank characterized by plastic flow; said machine comprising an elongated and longitudinally extending and substantially horizontally disposed tubular casing, an intermediate section of said casing being selectively removable with respect to the rear and front sections thereof, said intermediate casing section carrying a replaceable frangible diaphragm, whereby said farngible diaphragm carried by said intermediate casing section when the same is in place between said rear and front casing sections initially divides said casing into rear and front chambers respectively disposed in said rear and front casing sections, a rear wall closing the rear end of said casing, structure for closing the front end of said casing and for mounting the blank with at least a portion of the area of the inner surface thereof in communication with the interior of said casing, a die removably disposed closely adjacent to the outer surface of the mounted blank and in cooperating relation therewith, means for supplying a detonable gas into said rear chamber, and means for igniting the gas adjacent to and forwardly of said rear wall to produce a forwardly traveling flame front in the detonable gas in said rear chamber, said rear chamber having a length that is at least three times the average lateral dimension thereof so as to provide and induction distance for the purpose of transforming the forwardly traveling flame front into a forwardly traveling detonation wave in the detonable gas before it reaches said frangible diaphragm, the forwardly traveling detonation wave being characterized by a substantial overpressure and forward travel at supersonic velocity and also being characterized by a planar shock front having a predetermined pressure therein, said shock front rupturing said frangible diaphragm and producing a forwardly traveling shock wave in said front chamber, the forwardly traveling shock wave being characterized by a substantial overpressure and forward travel at supersonic velocity and also being characterized by a planar shock front having a given high pressure therein, the impact of the shock front of the forwardly traveling shock wave upon the adjacent inner surface of the mounted blank generating a reflected wave that is productive of a working pressure thereupon that is substantially higher than the overpressure of the shock wave, the working pressure acting upon the adjacent inner surface of the mounted blank deforming the blank at a high strain rate so as to move the same at a high velocity into the die to shape the blank.

19. The machine set forth in claim 18, and further comprising mechanism for selectively moving said intermediate casing section laterally between an operative position placed between the respectively adjacent ends of said rear and front casing sections and a repair position displaced from between the respective adjacent ends of said rear and front casing sections, said mechanism being operative to roll said intermediate casing section between its operative and repair positions and to preserve the locations of longitudinal and circumferential fit of said intermediate casing section with respect to the adjacent ends of said front and rear casing sections when said intermediate casing section is returned into its operative position.

20. The machine set forth in claim 19, wherein said mechanism essentially comprises a pair of substantially parallel longitudinally spaced-apart gears respectively carried by said intermediate casing section, and a pair of substantially parallel longitudinally spaced-apart and laterally extending racks supported externally of said intermediate casing section and respectively engaging said gears.

21. A machine for imparting a desired shape to a blank characterized by plastic flow; said machine comprising an elongated and longitudinally extending tubular casing including a rear section and a front section and a transition section interconnecting said rear section and said front section, said rear section and said front section having different average lateral dimensions, a rear wall closing the rear end of said casing, structure for closing the front end of said casing and for mounting the blank with at least a portion of the area of the inner surface thereof in communication with the interior of said casing, a die removably disposed closely adjacent to the outer surface of the mounted blank and in cooperating relation therewith, means for supplying a detonable gas into said casing, and means for igniting the gas adjacent to and forwardly of said rear wall to produce a forwardly traveling flame front in the detonable gas, said rear section having a length that is at least three times the average lateral dimension thereof so as to provide an induction distance for the purpose of transforming the forwardly traveling flame front into a forwardly traveling detonation wave in the detonable gas, the forwardly traveling detonation wave being characterized by a substantial overpressure and forward travel at supersonic velocity and also being characterized by a planar first shock front having a predetermined high pressure therein, said front section having a length that is greater than the average lateral dimensions thereof so that the first shock front after traveling through said transition section is reformed as a planar second shock front having a given high pressure therein, the impact of the second shock front upon the adjacent inner surface of the mounted blank generating a reflected wave that is productive of a working pressure thereupon that is substantially higher than the pressure in the second shock front, the working pressure acting upon the adjacent inner surface of the mounted blank deforming the blank at a high strain rate so as to move the same at a high velocity into the die to shape the blank.

22. The machine set forth in claim 21, wherein said front section has a larger average lateral dimension than that of said rear section.

23. The machine set forth in claim 21, wherein said transition section is formed substantially as a cone and the inner walls thereof are disposed at an angle with respect to the longitudinal axis of said casing no greater than about 30°.

24. A machine for imparting a desired shape to a blank characterized by plastic flow; said machine comprising an elongated and longitudinally extending and substantially horizontally disposed tubular casing including a rear section and a front section and a transition section interconnecting said rear and front sections, said transition and front sections of said casing being selectively removable with respect to the rear section thereof, said rear and front sections having different average lateral dimensions, a rear wall closing the rear end of said casing, structure for closing the front end of said casing and for mounting the blank with at least a portion of the area of the inner surface thereof in communication with the interior of said casing, a die removably disposed closely adjacent to the outer surface of the mounted blank and in cooperating relation therewith, means for supplying a detonable gas into said casing, and means for igniting the gas adjacent to and forwardly of said rear wall to produce a forwardly traveling flame front in the detonable gas, said rear section having a length that is at least three times the average lateral dimension thereof so as to provide an induction distance for the purpose of transforming the forwardly traveling flame front into a forwardly traveling detonation wave in the detonable gas, the forwardly traveling detonation wave being characterized by a substantial overpressure and forward travel at supersonic velocity and also being characterized by a planar first shock front having a predetermined high pressure therein, said front section having a length greater than the average lateral dimension thereof so that the first shock front after traveling through said transition section is reformed as a planar second shock front having a given high pressure therein, the impact of the second shock front upon the adjacent inner surface of the mounted blank generating a reflected wave that is productive of a working pressure thereupon that is substantially higher than the pressure in the second shock front, the working pressure acting upon the adjacent inner surface of the mounted blank deforming the blank at a high strain rate so as to move the same at a high velocity into the die to shape the blank.

25. A machine set forth in claim 24, and further comprising mechanism for selectively moving said transition and front sections laterally between an operative position disposed adjacent and in alignment with said rear section and a storage position displaced laterally from the adjacent end of said rear section, said mechanism being operative to roll said intermediate and front sections between the operative and storage positions thereof and to preserve the locations of longitudinal and circumferential fit of said transition section with respect to the adjacent end of said rear section when said transition and front sections are returned into the operative position thereof.

26. The machine set forth in claim 25, wherein said mechanism essentially comprises a pair of substantially parallel longitudinally spaced-apart gears respectively carried by said transition and front sections, and a pair of substantially parallel longitudinally spaced-apart and laterally extending racks supported externally of said transition and front sections and respectively engaging said gears.

References Cited
UNITED STATES PATENTS

| | | | |
|---|---|---|---|
| 3,057,313 | 10/1962 | Setser | 72—56 |
| 3,195,334 | 7/1965 | Filler | 72—56 |
| 3,218,834 | 11/1965 | Hawesworth et al. | 72—56 |
| 3,228,222 | 1/1966 | Maier | 72—56 |
| 3,252,312 | 5/1966 | Maier | 72—56 |

FOREIGN PATENTS

| | | |
|---|---|---|
| 87,327 | 5/1959 | Denmark. |
| 742,460 | 12/1955 | Great Britain. |
| 148,780 | 1962 | Russia. |

OTHER REFERENCES

Watts et al.: Why Form Explosively?, From The Tool Engineer, April 1960, pp. 109–112.

Advanced High-Energy-Rate Forming: Book II, Copyright 1962 by Astme, article entitled "Explosive Forming with Gas Mixtures," SP 62–02, by Richard E. Lingen, pp. 1–12.

Mechanical Engineering, April 1962, article entitled "Try H.E.R. Techniques," by F. W. Boulger, pp. 38–44.

International Science and Technology, June 1962, section heading "Forming with Burning Gas Mixture," Ford Park, Associate Editor.

RICHARD J. HERBST, *Primary Examiner.*

A. L. HAVIS, *Assistant Examiner.*